United States Patent
Gehringhoff et al.

(10) Patent No.: US 6,517,142 B2
(45) Date of Patent: Feb. 11, 2003

(54) SIDE IMPACT SUPPORT

(75) Inventors: Ludger Gehringhoff, Paderborn-Sande (DE); Johannes Schäfers, Borchen (DE)

(73) Assignee: Benteler AG, Paderborn (DE)

(*) Notice: Subject to any disclaimer, the term of this patent is extended or adjusted under 35 U.S.C. 154(b) by 0 days.

(21) Appl. No.: 09/933,142

(22) Filed: Aug. 20, 2001

(65) Prior Publication Data

US 2002/0043817 A1 Apr. 18, 2002

(30) Foreign Application Priority Data

Aug. 19, 2000 (EP) ............................................. 00117869

(51) Int. Cl.$^7$ ................................................. B60J 5/04
(52) U.S. Cl. ..................... 296/146.6; 296/188; 296/189
(58) Field of Search .............................. 296/146.6, 188, 296/146.5, 146.1, 189; 49/502; 52/729.3, 729.5, 735.1

(56) References Cited

U.S. PATENT DOCUMENTS

| | | | | |
|---|---|---|---|---|
| 3,882,970 A | * | 5/1975 | Newman, Jr. ................. 49/502 |
| 4,796,946 A | * | 1/1989 | Wilson et al. ............ 296/146.6 |
| 4,901,500 A | * | 2/1990 | Wycech ....................... 296/189 |
| 4,978,562 A | * | 12/1990 | Wycech ...................... 428/35.2 |
| 5,272,841 A | * | 12/1993 | Freeman et al. ............... 49/502 |
| 5,692,797 A | * | 12/1997 | Dancasiu ..................... 296/188 |
| 5,887,938 A | * | 3/1999 | Topker et al. ............... 296/188 |
| 5,908,216 A | * | 6/1999 | Townsend ................. 296/146.6 |
| 6,227,609 B1 | * | 5/2001 | Mellis ........................ 296/188 |
| 6,290,282 B1 | * | 9/2001 | Hortlund et al. ......... 296/146.6 |
| 6,302,473 B1 | * | 10/2001 | Weber ..................... 296/146.6 |
| 6,398,289 B1 | * | 6/2002 | Gehringhoff ............. 296/146.6 |

FOREIGN PATENT DOCUMENTS

EP 0 728 607 A2 8/1996
EP 0 662 053 B1 4/1997

* cited by examiner

*Primary Examiner*—D. Glenn Dayoan
*Assistant Examiner*—G Blankenship
(74) *Attorney, Agent, or Firm*—Henry M. Feiereisen

(57) ABSTRACT

A side impact support is described that can be incorporated in a vehicle door, for example, the door of an automobile. The side impact support is made of a metal sheet with a hat-shaped cross-section and two lateral legs connected by a web. The width of the end sections of the side impact support increases towards its end faces. According to the invention, the hat-shaped cross-section of the end sections extends to the end faces and increases in height and width. Preferably, side flanges projecting in the transverse direction are provided on the longitudinal edges of the profile, wherein the side flanges extend beyond the end sections to the end faces.

7 Claims, 1 Drawing Sheet

SIDE IMPACT SUPPORT

CROSS-REFERENCES TO RELATED APPLICATIONS

This application claims the priority of European Patent Application Serial No. 00 117 869.8, filed Aug. 19, 2000, the subject matter of which is incorporated herein by reference.

FIELD OF THE INVENTION

The invention relates to a side impact support in form of a reinforcement component for an automobile door, and more particularly to a side impact support made of a metal sheet with a hat-shaped cross-section and with two legs connected by a web, wherein the end sections of the metal sheet are widened to towards the end faces.

BACKGROUND OF THE INVENTION

Side impact supports are used as door reinforcements and primarily intended to protect the occupants of passenger vehicles from injury in the event of a side impact. Depending on the rigidity of the basic construction, they should have a high stiffness transverse to the driving direction.

EP 0 728 607 A2 discloses a tubular design as well as a folded design of a side impact support with trapezoidally flat widened end sections. EP 0 662 053 C1 discloses a side impact support which along most of its length has a hat-shaped cross-sectional profile, wherein the end sections are flat towards the end faces and increase in width.

Side impact supports of this type are typically manufactured from conventional drawing metal sheets. The hat-shaped profiles are advantageously made of in one piece and are therefore lighter than tubular side impact supports.

The aforedescribed side impact supports made of sheet metal profile have as a common feature that they have a flat taper towards the ends where they are fitted against the inside metal sheet of the door. The side impact supports reinforce the door structure and absorb energy in the event of a side crash. However, the ends of the side impact supports represent a weak point, leading to buckling and bulging. This presents a particularly disadvantage in the event of a frontal crash.

It would therefore be desirable to provide a side impact support which is easy to manufacture and assemble and which is capable of transferring axial forces produced by a frontal crash from the A column to the B column.

SUMMARY OF THE INVENTION

According to one aspect of the invention, the end sections of the side impact support have a hat-shaped cross-section, with the hat-shaped cross-section extending to the end faces. The side impact supports thereby transfer the axial forces from the A column to the B column to protect the occupants in the event of a frontal crash. This design eliminates or at least reduces deformations in the corner regions, i.e., in the connecting regions of the side impact support between the A column and the B column in the vehicle door. Even where manufacturing constraints mandate that the support is offset with respect to the position of the A column and B column, are the forces essentially transmitted in a straight line from the A column into the side impact support and from the side impact support to the B column.

The hat-shaped profile of the end sections can become wider and/or increase in height. The change in the cross-section can be continuous, linear or progressive. It is also feasible to provide a stepped change in cross-section.

The side impact support can be manufactured and assembled economically due to its simple one-piece construction.

In an advantageous embodiment, the height and width of the hat-shaped end sections increases. The increase in width of the end sections has either has either the shape of s trapezoid or of a funnel. This design enables an effective absorption and transfer of the axial forces in the event of a frontal crash. With a shape of the cross section provided by the invention, even forces introduced away from the center line are transferred effectively from the A column into the door structure. As a result, the front door structure does not deform, so that the door can be easily opened even after a crash. The passenger compartment therefore becomes stiffer, enhancing the overall safety for the passengers.

Preferably, the longitudinal edges of the profile can include side flanges projecting in the transverse direction. The side flanges can extend beyond the end sections up to the end faces. The side flanges increase the flexural strength of the side impact support.

According to yet another embodiment, attachment flanges can be provided on the end sections for attaching the side impact support to the vehicle door. Preferably, the attachment flanges are short flanges which are formed on the web on an end face of the side impact support as well as on the side flanges themselves.

Preferably, the open side of the side impact support is installed so as to be oriented towards the outer shell of a vehicle door. The side impact support has a high flexural strength, and hence reinforces the door structure and absorbs energy in the event of a side crash. Moreover, in the event of a frontal crash, axial forces are transferred via the A column through the side impact support continuously into the B column.

According to still another embodiment, the side impact support can be attached to the vehicle door with an adhesive. This is preferably implemented via the side flanges. This design also increases to the buckling stiffness of the side impact support and makes the door less susceptive to bulging.

The side impact support of the invention can be fabricated from high-strength hot formed or cold formed steel, but also from aluminum or similar light metals. The side impact support is preferably formed as a single piece and does not require additional support structures, thereby reducing its weight. Installation in the door structure is simple; for example, the attachment flanges can be spot-welded. The side impact support can also be attached by only using an adhesive.

Further features and advantages of the present invention will be apparent from the following description of preferred embodiments and from the claims.

BRIEF DESCRIPTION OF THE DRAWING

The following figures depict certain illustrative embodiments of the invention in which like reference numerals refer to like elements. These depicted embodiments are to be understood as illustrative of the invention and not as limiting in any way.

DETAILED DESCRIPTION OF PREFERRED EMBODIMENTS

Figure 3:
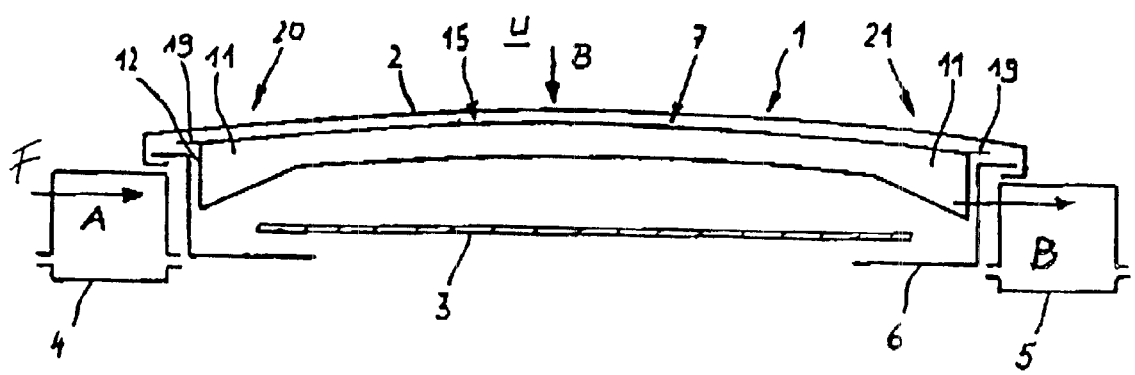
FIG. 3 shows schematically a horizontal longitudinal cross-section through the side impact support of FIG. 1 as installed between the A column and the B column.

Referring first to FIG. 3, a vehicle door 1 for a passenger automobile has an outside shell 2 with a slight convex curvature in the longitudinal direction of the vehicle towards the outside U.

A window pane 3 that can be raised and lowered, is located in the vehicle door and spaced apart from the outer shell 2. Also depicted schematically are the A column 4 that forms a part of the vehicle frame and the B column 5. Also indicated is the inner metal sheet 6 of the door.

Figure 1:
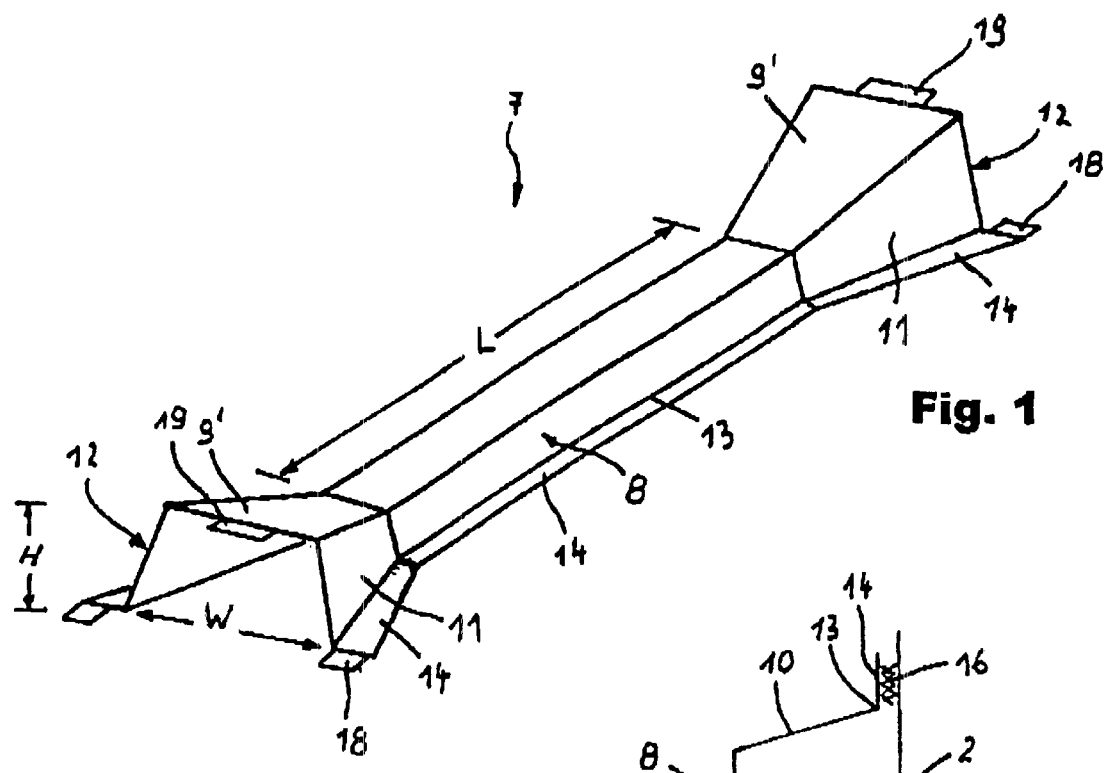
FIG. 1 is a perspective view of a side impact support.
Figure 2:
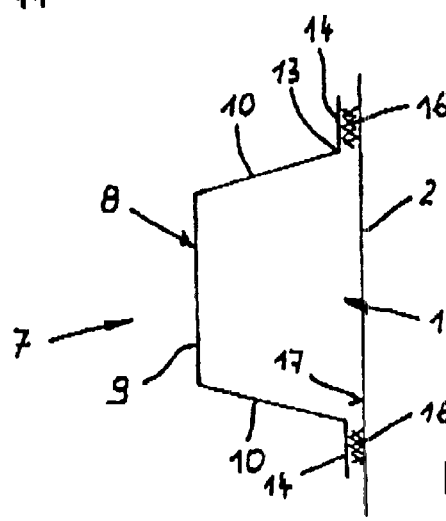
FIG. 2 is a simplified schematic of the side impact support in vertical cross-section.

A side impact support 7 is installed in the vehicle door 1 between the outer shell 2 and the window pane 3. The side impact support 7 is comprised of a metal sheet and is primarily intended for absorbing energy in the event of a side crash. The bending load is indicated in FIG. 3 by an arrow B. As seen in FIGS. 1 and 2, the side impact support 7 has two lateral legs 10 connected by a web 9 and forming a hat-shaped profile 8 along its longitudinal section L. End sections 11 are formed in one piece as an extension of the profile 8. The end sections 11 also have a hat-shaped cross-section that extends to the end faces 12 of the side impact support 7. Starting at the profile 8, both the height H and the width W of the cross-section of the end sections 11 widens.

Side flanges 14 project transversely from the longitudinal edges 13 of the profile 8. The side flanges 14 extend beyond the end sections 11 up to the end faces 12 of the side impact support 7.

As seen in FIGS. 2 and 3, the open side 15 of the side impact support 7 is oriented towards the outer shell 2 of the vehicle door 1. The resistance of the side impact support against buckling as well as the bulging stiffness of the vehicle door 1 and/or the outer shell 2 can be increased by attaching the side impact support 7 along the side flanges 14 to the inside 17 of the outer shell 2 with an adhesive 16, as illustrated in FIG. 2. The adhesive joint between the side impact support 7 and the outer shell 2 in FIG. 3 is not drawn to scale.

Short attachment flanges 18, 19 are provided on the end sections 11, particularly on the end face of the side flanges 14 and on the end face of the web 9' of the end sections 11. The attachment flanges 18, 19 can be used to attach the side impact support 7 to the vehicle door, for example, by spot welding.

With the width of the end sections 11 of the side impact support increasing from the center profile 8 in a trapezoidal fashion, axial forces (arrow F) are transferred in the event of a frontal crash from the A column 4 through the side impact support 7 continuously into the B column 5. As seen in FIG. 3, forces can also be introduced off-center (arrow F) from the A column 4 into the door structure. The increasing cross-sectional width of the end sections 11 also prevents deformations in the corner areas 20 and 21, respectively, between the A column 4 and the B column 5 and the door structure. In particular the front door structure is less severely deformed or not deformed in all, therefore facilitating opening of the vehicle door after a crash.

While the invention has been disclosed in connection with the preferred embodiments shown and described in detail, various modifications and improvements thereon will become readily apparent to those skilled in the art.

Accordingly, the spirit and scope of the present invention is to be limited only by the following claims.

What is claimed as new and desired to be protected by letters patent is set forth in the appended claims.

What is claimed is:

1. Side impact support for incorporation in a vehicle door, comprising:

a profile being made of a metal sheet and having a hat-shaped cross-section with two legs connected by a web over at least a major portion of its length, the profile further including two end sections which are made of the metal sheet and have each a profile-distal end face and a profile-proximal end face, wherein each of the end sections has a hat-shaped cross-section which extends up to the profile-distal end face and becomes wider towards the profile-distal end face.

2. The side impact support of claim 1, wherein both the height and the width of the hat-shaped end sections increases towards the profile-distal end face.

3. The side impact support of claim 1, wherein the profile has longitudinal edges and wherein transversely projecting side flanges are provided on the longitudinal edges of the profile.

4. The side impact support of claim 3, wherein the side flanges extend beyond the end sections up to their profile-distal end face.

5. The side impact support of claim 1, wherein the end sections include attachment flanges.

6. The side impact support of claim 1, wherein a side of the profile facing away from the web is oriented towards an outer shell of the vehicle door.

7. The side impact support according to claim 1, wherein the side impact support is attached to the vehicle door with an adhesive.

* * * * *